No. 807,142. PATENTED DEC. 12, 1905.
E. TILDEN.
PROCESS OF PRESERVING MEATS.
APPLICATION FILED JUNE 7, 1902.
3 SHEETS—SHEET 1.
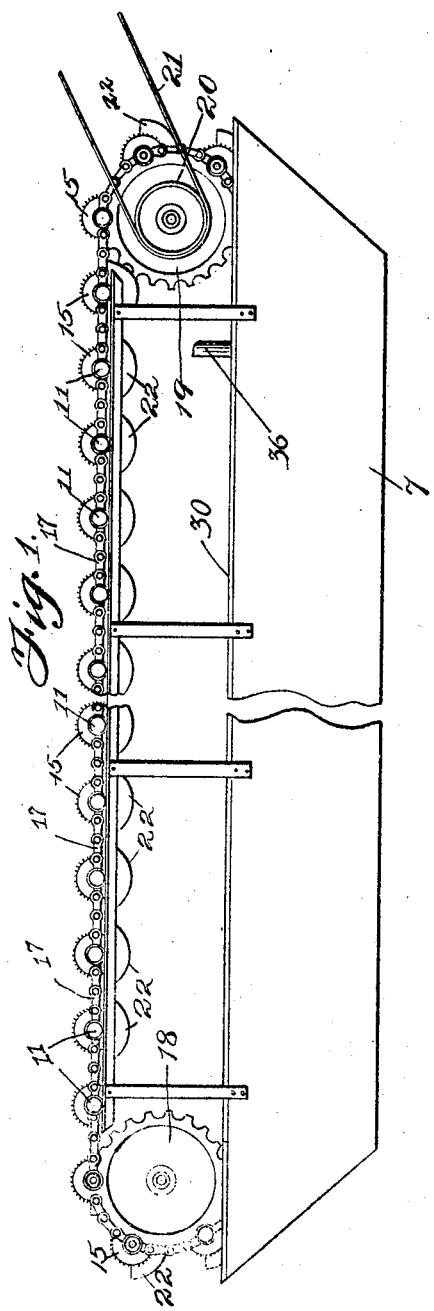
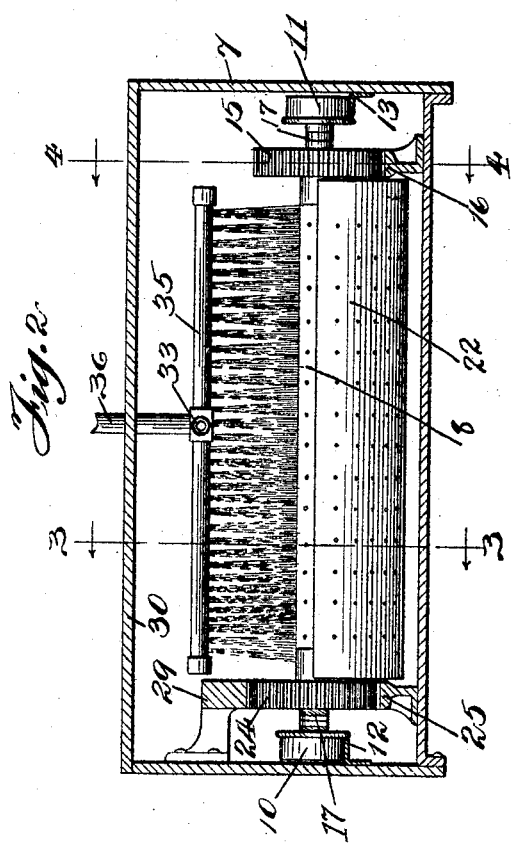
Witnesses:
Ira D. Perry
J B Weir
Inventor:
Edward Tilden,
by Bond, Adams, Pickard Jackson
his Attys.

No. 807,142. PATENTED DEC. 12, 1905.
E. TILDEN.
PROCESS OF PRESERVING MEATS.
APPLICATION FILED JUNE 7, 1902.
3 SHEETS—SHEET 2.
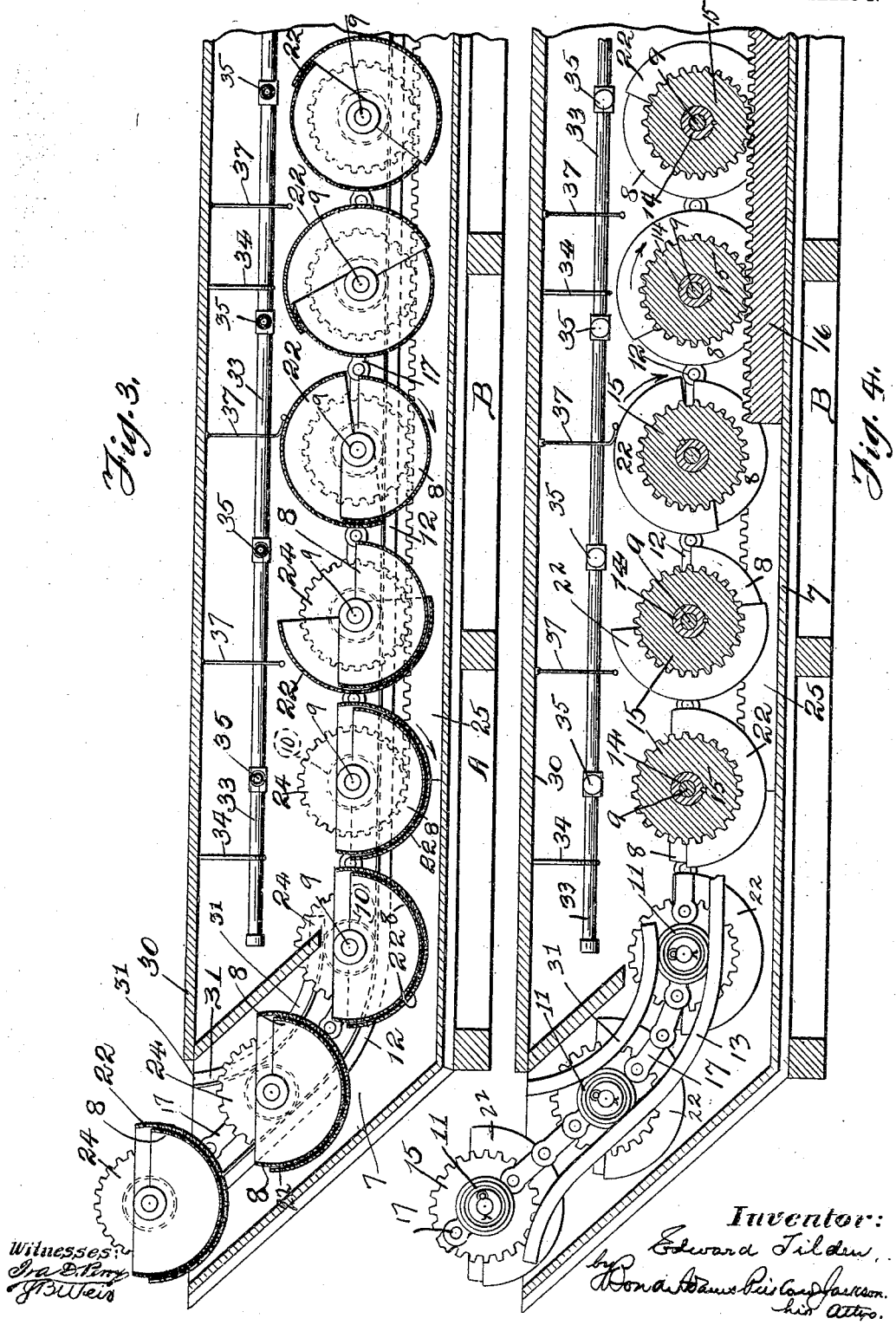

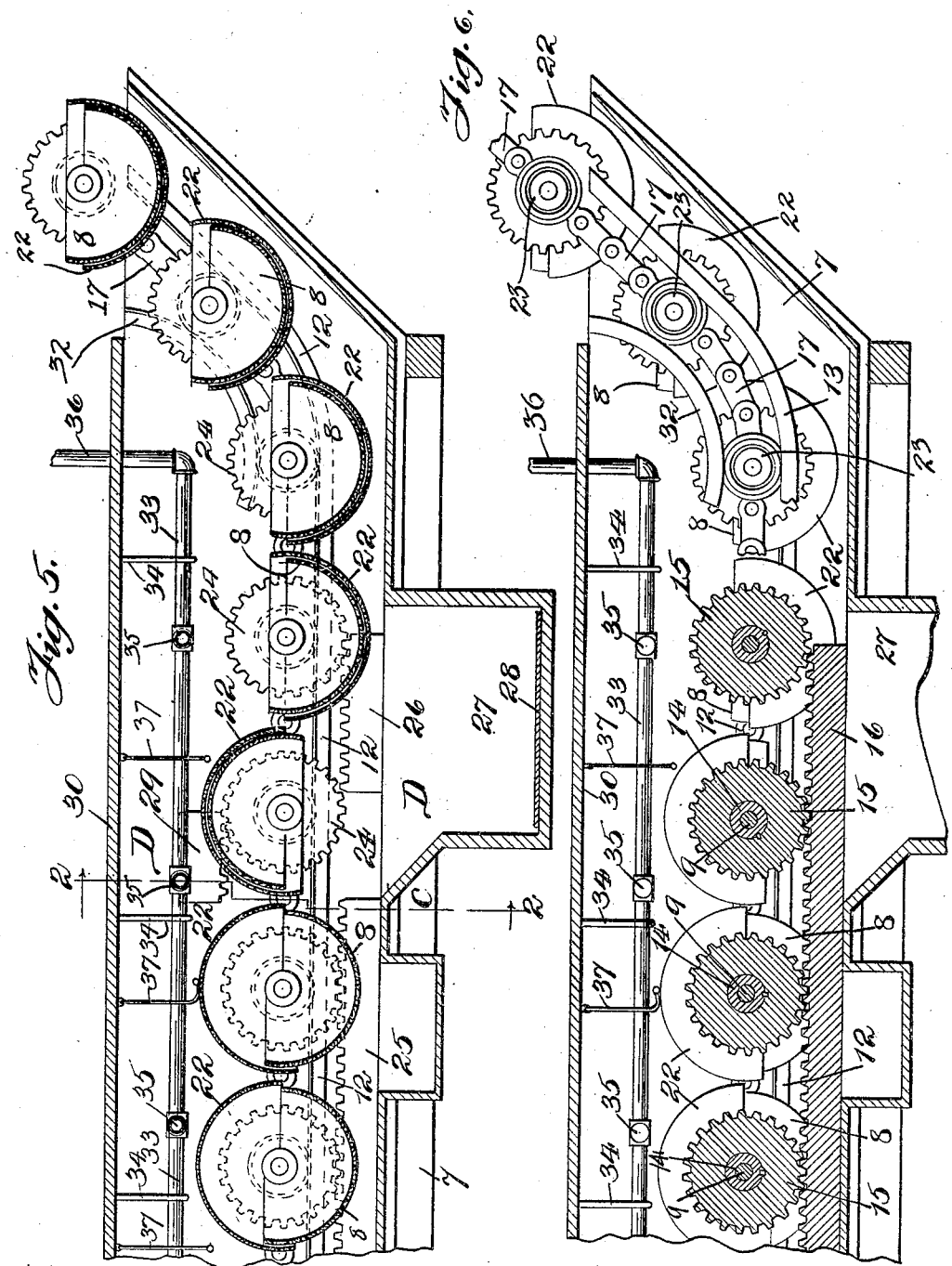

UNITED STATES PATENT OFFICE.

EDWARD TILDEN, OF CHICAGO, ILLINOIS.

PROCESS OF PRESERVING MEATS.

No. 807,142.      Specification of Letters Patent.      Patented Dec. 12, 1905.

Application filed June 7, 1902. Serial No. 110,632.

*To all whom it may concern:*

Be it known that I, EDWARD TILDEN, a citizen of the United States, residing at Chicago, in the county of Cook and State of Illinois, have invented a certain new and Improved Process of Preserving Meats, of which the following is a specification, reference being had to the accompanying drawings.

My invention relates to the preservation of meats and analogous substances, and has special reference to processes involving the preservation of meats by the use of receptacles in which the meats are hermetically sealed. The process of treating meats commonly in use consists in first cooking the meats and placing them in cans or other equivalent receptacles, then sealing them up *in vacuo*, and afterward processing the meat while contained in the sealed cans. This processing consists in passing the filled cans through a bath heated to a suitable temperature, the cans being kept in their receptacle for a sufficient length of time, after which they are removed and cooled. I have discovered that in the treatment of canned meats in the manner above described the meat fats and jellies accumulate in certain parts of the cans, so that when the process of treatment is completed they are not distributed throughout the contents of the can, but are accumulated at certain points. This separation of the fat and jelly is objectionable for various reasons, which it is not necessary to mention. It is sufficient for present purposes to say that the object of my invention is to provide a process of treatment by which the fat and jelly are retained practically in their normal condition of distribution throughout the contents of the can, so that when the processing is finished the contents of the can are substantially normal so far as the distribution of the component parts of the meats is concerned.

My improved process consists in rotating the cans during the processing operation for a greater or less length of time.

I use the term "processing operation" in a generic sense, including both the cooking and cooling steps; but I find that the object of the rotation is satisfactorily accomplished by rotating the cans only during the cooling operation, since while the contents of the can are hot the fats and jellies are in a fluid state, and consequently are readily disseminated throughout the contents of the can by its rotation. When the cooling operation commences they are still fluid; but after it has progressed they gradually congeal until they finally assume the solid state. It is therefore necessary to rotate or agitate the cans in an equivalent way during the cooling operation until the contents of the cans solidify; but it is not necessary to rotate the cans during the cooking operation, although it may be done, if desired.

In carrying out my process I prefer to employ an automatic apparatus designed for the purpose, which forms the subject-matter of an application for patent filed by Horace C. Gardner; but any other suitable apparatus may be employed for the purpose. In the drawings, however, I have shown the Gardner apparatus as illustrating a practical form of mechanism well adapted for carrying out my improved process.

In the accompanying drawings, Figure 1 is a side elevation, some parts being broken away, illustrating such apparatus. Fig. 2 is a cross-section on line 2 2 of Fig. 5. Fig. 3 is a longitudinal section on line 3 3 of Fig. 2. Fig. 4 is a similar view, being a partial section taken on line 4 4 of Fig. 2. Fig. 5 is also a longitudinal section on line 3 3 of Fig. 2, taken at the opposite end from that shown in Fig. 3; and Fig. 6 is a longitudinal section on line 4 4 of Fig. 2, also showing the end of the apparatus opposite that shown in Fig. 4.

Before describing in detail the apparatus shown in the drawings I wish to explain that the processing apparatus as a whole, of which the cooling apparatus is a part, comprises a processing-tank, through which the sealed cans are carried in suitable baskets, and a cooling apparatus by which the cans are cooled after their contents have been properly cooked. The baskets in which the cans are placed are preferably semicylindrical in form and are of sufficient size to hold a large number of cans. They are connected together in an endless series by link belts at their ends and are moved through the processing-tank and the cooling apparatus by suitable mechanism, which operates to cause the baskets to travel at the proper rate of speed. The processing-tank is of sufficient length and the speed of travel is so proportioned to the length of said tank that the time consumed by the cans in passing through the processing-tank suffices for the proper cooking of the meats in the cans. After the meats have been cooked and cooled the cans are discharged from the baskets and are carried off by a suitable conveyer.

In the drawings I have shown only the cooling apparatus, since, as I have already explained, in carrying out my improved process it is necessary to rotate the cans only while they are being cooled.

I will now describe in detail the apparatus illustrated in the accompanying drawings.

7 indicates a tank, through which the baskets are caused to travel while the cans are being cooled. The tank 7 is of a suitable length, so that the cans in moving through it will be properly cooled.

8 indicates the can-holding baskets, which, as shown in Figs. 3 and 4, are suspended from short shafts 9, the ends of which project beyond the baskets and carry wheels 10 11, adapted to run on rails 12 13, at opposite sides of the tank 7, as shown in Fig. 2. The basket 8 has at one end a projecting sleeve 14, which extends a short distance beyond the end of the basket and carries a pinion 15, as shown in Figs. 2 and 4. The pinion 15 is adapted to engage a stationary rack 16, secured to the bottom of the tank 7 in the path of the pinion 15 and extending from near one end to near the other end of the tank, as best shown in Figs. 4 and 6.

I would explain here that Figs. 3 and 4 show the inlet portion of the tank 7, while Figs. 5 and 6 show the outlet portion thereof.

From the foregoing description it will be understood that when the pinion 15 is not in engagement with the rack 16 the basket 8 will hang suspended from the shaft 9; but when the pinion 15 engages the rack 16 the basket 8 will be rotated about the shaft 9 as the basket progresses. The number of baskets employed depends, of course, on the length of the apparatus, all the baskets, with the shafts 9 on which they are mounted, being connected together in the form of an endless series by links 17, as best shown in Figs. 4 and 6, a series of links being provided near each end of the shafts 9. In Fig. 1 I have illustrated the series of shafts and baskets as operating only in connection with the tank 7, this being done in order to illustrate a complete cooling apparatus as distinct from an entire processing apparatus, involving, in addition to the cooling apparatus, the processing-tank. I have therefore shown sprocket-wheels 18 19 near the opposite ends of the tank, with a pulley 20 and belt 21 for driving them, and consequently causing the series of baskets to travel through the tank 7; but it will be understood that in a complete processing-machine, where the processing-tank also is provided, the series of baskets is not limited in its travel to the cooling-tank 7, but passes also through the processing-tank.

To prevent the contents of the baskets 8 from being discharged when the baskets rotate, as described, semicylindrical hoods 22 are provided, which conform in shape to the baskets 8 and normally hang suspended from the shafts 9 below and adjacent to the baskets 8 in the manner illustrated in certain portions of Figs. 3 and 5. The hoods 22 are mounted similarly to the baskets 8 and are provided at the end opposite the pinions 15 with sleeves 23, which carry pinions 24, similar to the pinions 15, as best shown in Fig. 2. The pinions 24 are adapted to engage stationary racks 25, secured in the tank 7 in the path of said pinion 24, as also shown in Fig. 2. The rack 25 extends nearer the inlet end of the tank 7 than the rack 16, as shown in Fig. 4. The opposite end of said rack, however, terminates farther from the outlet end of the tank 7 than the rack 16, as shown in Figs. 5 and 6. The object of this arrangement will more fully hereinafter appear.

26 indicates a third rack, which is, in effect, a continuation of the rack 25, as it is located in line with it and between the outlet end of the tank and the adjacent end of the rack 25. (See Fig. 5.)

27 indicates an outlet-chute through which the cans are discharged.

28 indicates a conveyer upon which the discharged cans are received and by which they are conducted away from the tank 7.

29 indicates a fourth rack located above and in line with the path of the pinions 24, as best shown in Fig. 5. Said rack is placed between the rack 26 and the adjacent end of the rack 25, as shown in Fig. 5.

30 indicates the top of the tank 7, which extends from near one end of the tank to near the other end thereof, sufficient space being left beyond the ends of the cover 30 for the passage of the baskets, as shown in Figs. 3 and 5.

31 32 indicate guide-rails, which are placed at the ends of the tank 7 in the same vertical planes as the rails 12 13, respectively, but removed from said rails far enough to permit the wheels 10 11 to pass between them, as shown in Figs. 3 and 6. The rails 31 32 serve to guide the wheels 10 11 as they enter and leave the tank 7.

33 indicates a sprinkler-main which extends lengthwise of the tank, being suspended, preferably, from the cover 30 of the tank by hangers 34, as shown in Figs. 3 and 4.

35 indicates sprinkler-pipes, which are connected to the main 33 and extend transversely of the tank over the path of the baskets, as best shown in Figs. 2 and 4. The pipes 35 are perforated on their under sides, so that they discharge upon or into the baskets.

36 indicates a supply-pipe which communicates with the main 33, as shown in Fig. 2.

37 indicates deflectors, which are suspended from the cover 30 of the tank and serve to distribute the air flowing through the tank. In practice air is blown through the tank 7 from end to end to promote the cooling, this being accomplished by suitable blower mechanism. (Not shown.)

The operation is as follows: The baskets during the cooking operation are in the position shown at the extreme left in Figs. 3 and 4, both the basket and hood being suspended naturally from the shaft 9. When any given basket reaches the position A in Fig. 3, its pinion 24 engages the rack 25, and consequently the hood 22 commences to rotate, moving in the direction indicated by the arrow in Fig. 3. By the time position B is reached the hood 22 is inverted over the basket 8, so that the basket, with its hood, forms, in effect, a closed cylinder. At this time the pinion 15 reaches the beginning of the rack 16, as shown in Fig. 4, and consequently begins to rotate. The hood continues to rotate with the basket, since its pinion 24 is still in engagement with the rack 25, and the rotation of both the hood and the basket continues until position C (shown in Fig. 5) is reached. This position marks the termination of the rack 25 and the beginning of overhead rack 29. The parts are so adjusted that shortly before position C is reached the basket 8 is in a position corresponding to its normal suspended position, while the hood 22 is inverted over it, as shown in Fig. 5. When the position C is reached the basket 8 occupies a tilted position, while the hood 22 has been moved downward slightly. The pinion 24 then engages the rack 29, which serves the purpose of moving the hood 22 back sufficiently to restore it to a directly-inverted position, and by the time the end of the rack 29 is reached the basket 8 also will occupy a similar position, as shown at D in Fig. 5. The chute 27 commences at point C, so that by the time the basket is inverted it will be directly over the chute, and the contents of the basket will therefore be discharged thereinto. The rack 26 commences at point D, as shown in Fig. 5, and consequently it there engages pinion 24 and acts to return the hood 22 to its lower or normal position, as shown at the right in Fig. 5. The rack 16 terminates substantially in line with the end of the rack 26 which lies nearer the outlet, so that the basket 8 returns to its normal position at the same time as the hood 22. The baskets then pass out of the tank 7 and in due time receive another load.

It will thus be seen that during practically the entire cooling operation the cans carried in the baskets are rotated, so that the fluid matter therein is thoroughly disseminated throughout the contents of the cans, and consequently solidified in that condition.

It will be understood that while I prefer to use the apparatus illustrated and described in carrying out my improved process it forms no part of my invention and is not essential to it, as any other apparatus suitable for the purpose may be employed.

That which I claim as my invention, and desire to secure by Letters Patent, is—

1. The improvement in the art of treating meats contained in sealed receptacles, which consists in processing the meats and agitating the receptacle while cooling so as to disseminate the fluid matter therein throughout the contents thereof, substantially as described.

2. The improvement in the art of treating meats contained in sealed receptacles, which consists in processing the meats and rotating the receptacle until the fluid matter therein is substantially congealed, substantially as described.

EDWARD TILDEN.

Witnesses:
H. C. GARDNER,
J. B. ROGERS.